United States Patent [19]

Davis et al.

[11] 4,314,738
[45] Feb. 9, 1982

[54] AUXILIARY EQUIPMENT ENCLOSURE UNIT FOR WATTHOUR METER SOCKETS

[75] Inventors: Steven B. Davis, St. Mathews Township, Wake County, N.C.; Forrest E. Coyle, Penn Hills; Denis E. Bedel, Ross Township, Allegheny County, both of Pa.

[73] Assignee: Westinghouse Electric Corp., Pittsburgh, Pa.

[21] Appl. No.: 128,222

[22] Filed: Mar. 7, 1980

[51] Int. Cl.³ .................... H01R 13/52; H02B 9/00
[52] U.S. Cl. ..................... 339/156 R; 339/192 RL; 361/369
[58] Field of Search ........... 339/155 R, 156 R, 31 B, 339/192 RL, 198 M, 129, 132 R, 132 B; 324/156, 157; 361/369, 370, 371, 372, 374

[56] References Cited

U.S. PATENT DOCUMENTS

| 2,606,232 | 8/1952 | St. John | 361/366 |
|---|---|---|---|
| 2,664,132 | 12/1953 | Leverte | 339/132 R X |
| 2,907,928 | 10/1959 | Rutledge et al. | 339/132 R X |
| 3,067,362 | 12/1962 | Patton | 361/368 |
| 3,167,690 | 1/1965 | Wallman | 361/364 |
| 3,334,276 | 8/1967 | Bateman | 361/369 |
| 3,549,951 | 12/1970 | Plummer | 361/372 |
| 3,643,209 | 2/1972 | Coston | 339/155 R |
| 3,714,516 | 1/1973 | Howe | 361/368 |
| 3,783,343 | 1/1974 | Byland | 361/369 |
| 4,121,147 | 10/1978 | Becker et al. | 324/104 |

*Primary Examiner*—Eugene F. Desmond
*Attorney, Agent, or Firm*—D. R. Lackey

[57] ABSTRACT

A detachable enclosure unit for use at standard watthour meter sockets includes a central housing for carrying auxiliary equipment and a rear adaptive socket attachment assembly having a mounting extension and a retainer ring for adaptive mounting to both ring and ringless sockets. The retainer ring provides a circularly extending and radially disposed surface equally accommodating the different types of meter sockets.

19 Claims, 11 Drawing Figures

AUXILIARY EQUIPMENT ENCLOSURE UNIT FOR WATTHOUR METER SOCKETS

CROSS REFERENCE TO RELATED APPLICATIONS

This application is related to U.S. patent application Ser. No. 128,221 for an "Auxiliary Equipment Enclosure Unit For Watthour Meter Sockets" filed concurrently with this application and assigned to the same assignee.

BACKGROUND OF THE INVENTION

The present invention relates to an improved auxiliary equipment enclosure unit for detachable mounting at either ring or ringless types of watthour meter sockets.

Equipment enclosure units having interposed mounting between a detachable watthour meter and a standard watthour meter socket are known for installation of auxiliary equipment at an existing electric energy metering installation. The standard meter sockets include two conventional types referred to as the ring and ringless types. The meter sockets generally include an enclosure, which sometimes takes the form of a meter box, and female or jaw type terminals for receiving blade or bayonet type terminals extending from watthour meters having standard detachable mounting arrangements. When installing a detachable meter at a ring type socket, a conventional sealing ring having a split circular configuration and a U-shaped cross section is used. The sealing ring holds the periphery of a standard meter base arrangement, used in detachable watthour meters, against an outer extending radial mounting rim of the ring type socket. The ends of the sealing ring are locked in a contracted position for clamping the watthour meter on the ring socket, as is well known. When installing a detachable meter at a ringless type socket, which includes a box enclosure, a front cover of the enclosure is opened so that a circular hole thereof can receive the front of the meter. When the cover is closed, the edges of the cover hole opening prevent the meter from being removed from the meter socket enclosure. The above detachable meter mounting arrangements are often desired to accommodate mounting of an auxiliary equipment enclosure unit as well as detachable watthour meters at either type of meter socket.

When auxiliary or supplementary metering and distribution line control equipment or circuits are to be removably installed at standard detachable watthour meter sockets, the associated enclosure units are desired to have a number of characteristics. The enclosure units are to carry and protect different equipment devices or circuits which may be larger than the diameter of a detachable meter; be capable of having the rear end thereof easily and simply attached to either of the two types of ring and ringless meter sockets; be capable of having a detachable watthour meter attached at a front end, thereof, if desired; be capable of maintaining the standard metering connections between the meter and the socket terminals when a detachable meter is mounted thereto; be made in a simple and low cost manner; and be useable without alteration or modification of the detachable mounting arrangements of either the meter socket or meter.

In U.S. Pat. No. 4,121,147 an auxiliary housing has an open front which carries a standard watthour meter and further includes auxiliary jaw terminals receiving the meter blade terminals. The rear of the auxiliary housing has an outer circular rim substantially the same diameter as the rear mounting flange of the base of a standard watthour meter. Auxiliary blade terminals are provided at the housing rear for insertion into meter socket terminals. An auxiliary housing or enclosure of the aforementioned type is satisfactory and can be installed at either type of meter sockets so long as the outer periphery of the auxiliary housing does not extend radially beyond the rear mounting rim thereof. Often the housing size cannot be so limited and still be satisfactory for carrying larger types of auxiliary equipment. In U.S. Pat. No. 3,714,516 a large auxiliary equipment housing is disclosed for mounting between a detachable watthour meter and either of the ring or ringless types of meter sockets. A separate mounting adapter fastens to the rear of the housing and has two separate diametrically disposed locking members which must be installed with screws. Each locking member has two axially spaced and radially extending fingers to form two diametrical sets of radially extending fingers. The different set of coplanar fingers provide two relatively small radial extensions for clamping the housing to either the ring or ringless types of meter sockets. An additional set of resiliently biased blade to jaw terminal connections or joints are required in the housing.

Further examples of prior art auxiliary equipment enclosure units are disclosed in U.S. Pat. Nos. 2,606,232; 3,067,362; 3,167,690; 3,334,276; 3,549,951; and 3,643,209; for use with watthour meters and with one but not both types of meter sockets and wherein the enclosure unit has a larger size than the diameter of the meter.

SUMMARY OF THE INVENTION

In accordance with the present invention an auxiliary equipment enclosure unit is made for ease of detachable mounting at either of standard ring and ringless types of meter sockets. The enclosure unit includes a box-like housing having the interior arranged for carrying, in a protected relationship, auxiliary metering and distribution power line control equipment which may be provided partly or wholly on circuit boards, for example. Such equipment and circuits are typically included in communications terminal, remote load control and remote meter reading circuits and devices used in power line carrier communication systems. The front end of the enclosure preferably includes a meter attachment assembly for receiving the standard mounting arrangement of a detachable watthour meter. The rear end of the enclosure includes an adaptive socket attachment assembly having a mounting extension extendible in a reduced area from the rear of the housing so as to be adapted for insertion through the meter opening of an enclosure cover of a ringless meter socket. A radially extending retainer ring is carried by the mounting extension so as to circumscribe the periphery of the extension. The retainer ring member is carried by the mounting extension and is removable from the rear of the housing either by removing the extension when it carries the ring or by being separately mounted thereon in a slip-on or thread-on fashion. The retainer ring provides a circumferential flange surface extending radially outward of the periphery of the extension for restraining removal through a meter cover opening of a ringless socket or from an overlapping sealing ring when mounted to a ring type meter socket. In one preferred form, a removable retainer ring member includes a series of spaces or interruptions around the inner circumference so as to define radially inward extending tabs receivable by a recessed portion in the mounting extension.

The enclosure unit further includes separate blade terminal extensions which are fixedly attached in a rigidly clamped relationship to the blade terminals of a detachable meter. The terminal extensions extend from the meter, through the housing, and are supportable at the back of the mounting extension so as to extend from the enclosure unit to mate with the jaw terminals of a meter socket having a standard detachable meter mounting arrangement.

It is a general feature of the present invention to provide an auxiliary equipment enclosure unit that is mountable at meter sockets having standard detachable watthour meter mounting arrangements of either the ring or ringless types by including a simple adaptive socket attachment assembly not requiring different adjustments for use with the different types of meter sockets and not limiting the size of enclosure housing for receiving equipment therein. Another feature of the present invention is to provide a mounting extension at the rear end of the enclosure unit that carries a removable retainer ring member extending in a substantial or complete circumferential extent radially from the mounting extension so that an outer circular rim surface is formed generally corresponding to the mounting surface defined by the cover rim at the base of a detachable watthour meter for complementary mounting at either the ring or ringless types of meter sockets. A still further feature of this invention is to provide an auxiliary equipment enclosure unit for axially interposed mounting between a watthour meter and a meter socket both having standard detachable meter mounting arrangements wherein separately mountable blade terminal extensions thereof are connected in rigidly clamped relationship to the meter blade terminals to reduce contact resistance heating therebetween. A still further feature of this invention is to provide an auxiliary equipment unit including front and rear end parts for separate assembly to the ends of a central housing portion of the enclosure unit wherein the front end has a meter attachment assembly and the rear end has an adaptive socket attachment assembly so as to adapt different size housings for interposed mounting between a detachable watthour meter and a meter socket and to provide easy mounting of equipment devices of communications terminal or remote power line control or remote meter reading systems for compact and weather protected installation at detachable watthour meter sockets typically found at power line electric energy metering installations.

These and other features and advantages of the present invention will be apparent from the detailed description of the preferred embodiments of the invention as shown in the accompanying drawings briefly described hereinafter.

DESCRIPTION OF THE PREFERRED EMBODIMENTS

Figure 1:
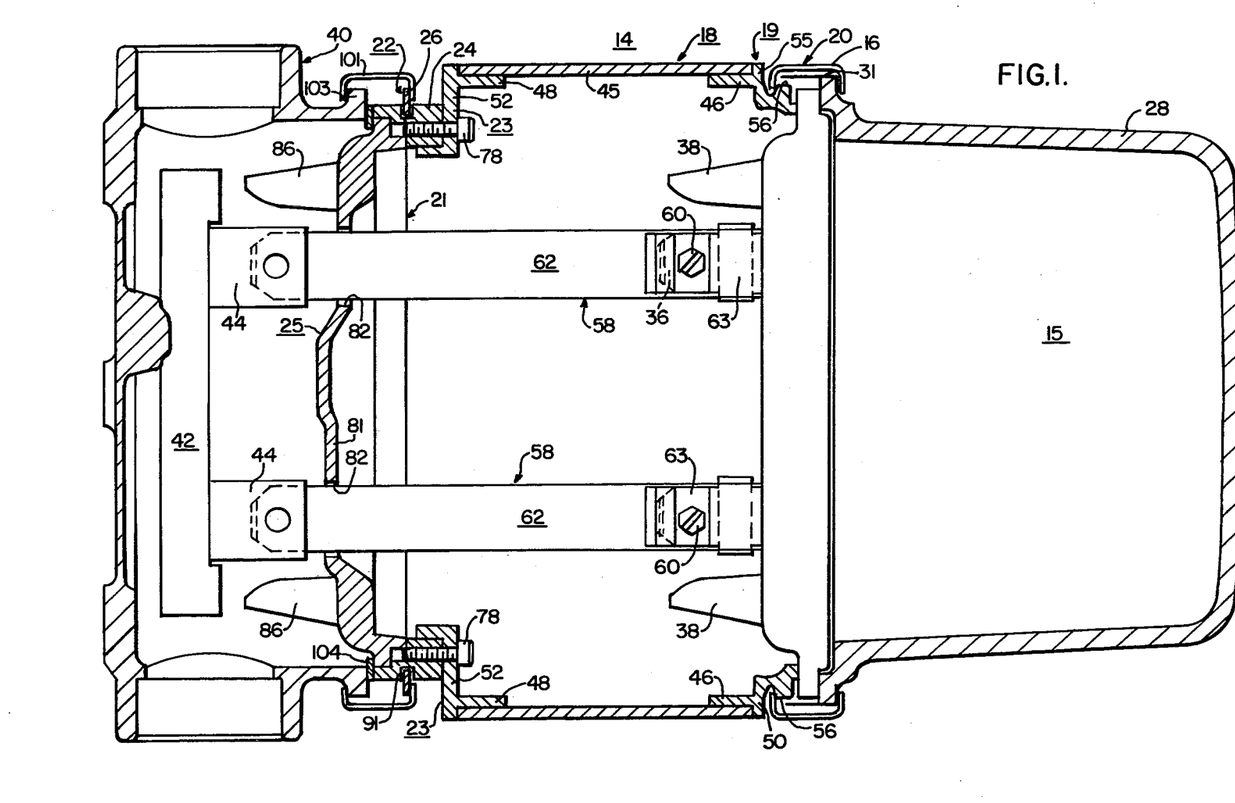
FIG. 1 is a side cross-sectional view of an auxiliary equipment enclosure unit made in the accordance with the present invention and mounted between a detachable watthour meter and a ring type of meter socket.

Referring now to the drawings and more particularly to FIG. 1 there is shown an auxiliary equipment enclosure unit 14 made in accordance with the present invention and attached to a detachable watthour meter 15 by means of a conventional sealing ring 16. The central body of the enclosure unit 14 includes a box-like equipment housing 18. A front end part 19 terminates the front of the housing 18 and includes a meter attachment assembly 20 of the unit 14 to receive the sealing ring 16 for mounting the meter 15 thereto. A rear part 21 terminates the back of the housing 18 and has an adaptive socket attachment assembly 22 forming an important part of the present invention. The rear end 21 in one preferred form includes a three part interconnected assemblage including a back plate 23, a mounting extension 24, and a base 25. The mounting extension 24 is included in the assembly 22 and extends rearward from the housing 18 to carry a removable retainer ring member 26, shown in a separate front view in FIG. 3. The ring member 26 is included in the socket attachment assembly 22 as described more fully hereinbelow.

Before describing the present invention in further detail, it is noted that the enclosure unit 14 is intended for one preferred use with detachable watthour meters, such as meter 15 having a standard detachable mounting arrangement, and standard meter sockets having either the ring or ringless types of standard detachable meter mountings. Standards for such detachable watthour meters and watthour meter sockets are published by the American National Standards Institute, (ANSI) Inc., 1430 Broadway, New York, NY 10018. Dimensional standards and configurations for detachable watthour meter mountings are set forth in ANSI standards C12.10 and are set forth for detachable meter mounting sockets in ANSI standards C12.7. Similar standards have been published by the National Electrical Manufacturers Association (NEMA) and the Edison Electrical Institute (EEI). These standards permit detachable meters, such as meter 15, to be made by different manufacturers so as to mate with the standard meter sockets also made by different manufacturers. Watthour or electric energy metering installations typically include the detachable meters mounted in the meter sockets having the detachable meter mounting arrangements at an electrical utility customer's location. The electric utility company's power line service usually is interconnected with the customer's local electrical system at a meter socket often mounted outside. Thus, such metering installations provide an accessible location for a power line communications terminal for which the enclosure unit 14 is intended for use in one preferred embodiment. Such communications terminals are effective to provide remote customer load control and remote watthour meter readings via carrier signals transmitted through an electric utility distribution system to the utility customer's premises. Alternatively, the enclosure unit 14 can carry various devices for power line control or monitoring at a power line location connected to a meter socket not intended to receive a meter in which case the meter 15 would not be attached to the front of the enclosure unit.

One example of a meter having the standard detachable mounting arrangement as included in the detachable watthour meter 15 is disclosed in U.S. Pat. No. 3,309,152, assigned to the assignee of this invention. The meter disclosed in the aforementioned patent is a single phase type typically installed at an electric energy metering installation of a residential electric utility customer. The meter 15 is typically equipped with either an electronic pulse initiator device or a meter dial encoding device as disclosed in U.S. Pat. Nos. 4,034,292 and 4,037,219, respectively, both assigned to the assignee of this invention. With meters of the above types, the enclosure unit 14 typically carries remote meter reading, remote load control and associated communications terminal equipment, not shown. For purposes of explanation and not limitation the detachable mounting arrangement of the watthour meter 15 is briefly described hereinafter, it being understood that other watthour meters such as those having a fifth terminal or those of the polyphase or demand meter type may replace the meter 15. The enclosure of the watthour meter 15 includes a cup shaped transparent cover 28 which is detachably mounted on a meter base 30 by means of a cover locking rim 31. One example of a watthour meter enclosure is disclosed U.S. Pat. No. 3,846,677, assigned to the assignee of this invention, wherein four conventional male or blade terminals 36 are described extending from the rear of the meter base 30. The blade terminals 36 are provided in accordance with the specifications for standard terminal arrangements as set forth in the standard publications noted hereinabove. Four feet projections 38 are formed integral with the meter base 32 adjacent the blades 36 for protecting the blade terminals 36 and for aiding mounting of the meter 18.

Figure 4:
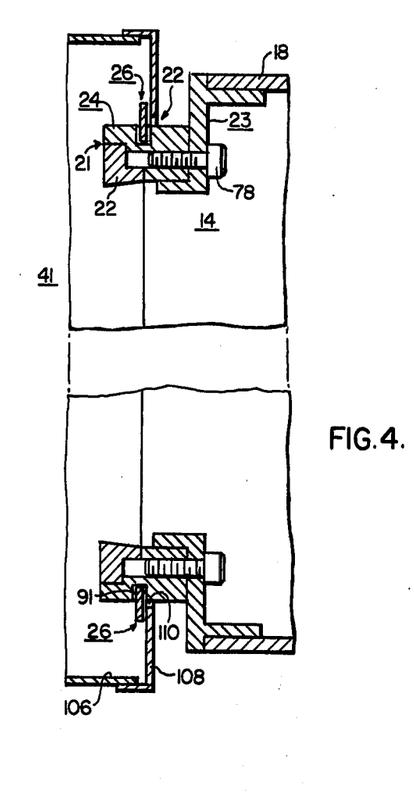
FIG. 4 is a fragmentary side cross sectional view of the rear end of the enclosure unit shown in FIG. 1 illustrating an alternative manner of mounting the unit to a ringless meter socket, partially shown.

Examples of standard ring and ringless types of meter sockets are described in the aforementioned standards publications and are shown in the prior U.S. patents listed above in the beginning of this specification. A side cross sectional view of a ring type meter socket 40 is shown in FIG. 1 and the fragmentary view of FIG. 4 shows a ringless type meter socket 41 for illustrating the different modes of mounting the enclosure unit 14 by means of the adaptive socket attachment assembly 22. Each of the meter socket types includes a terminal block such as the terminal block 42 shown in FIG. 1 carrying a standard socket terminal arrangement including female or jaw terminals 44. The jaw terminals 44 are provided to directly receive and resiliently contact the meter blades 36. Utility power line conductors and the customer wiring conductors are connected to the jaw terminals 44 at connections not shown, as also well known.

In FIG. 1 the detail arrangement of the enclosure unit 14 is shown and it is initially noted that in one preferred embodiment the enclosure unit 14 is intended to carry auxiliary equipment, by way of example and not limitation, formed by a remote power line communications terminal referred to as a load management terminal (LMT) system such as described and claimed in U.S. Pat. No. 4,130,874, assigned to the assignee of this invention. The equipment may be at least partially carried on circuit board cards. The present invention is not intended to be limited to any specific form or function of the auxiliary equipment to be carried by the equipment enclosure unit 14.

Figure 9:
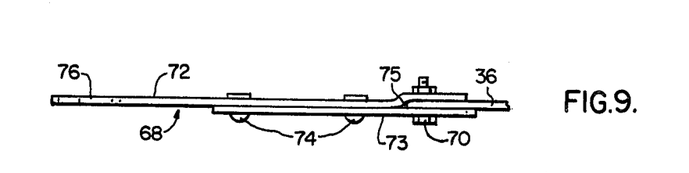
FIG. 9 is a side edge view of the blade extension shown in FIG. 8.

The housing 18 of the equipment enclosure unit 14 comprises square or rectangular side walls 45 made of sheet metal or of a molded plastic such as a thermosetting glass filled polyester material having high impact strength, light weight, high electrical insulating and dielectric strength characteristics as well as providing relatively low manufacturing costs and good resistance to weather. A substantially rectangular or square housing configuration is shown in FIG. 9 and the front and back ends of the housing side walls 45 are open. The ends are terminated by the front and rear end parts 19 and 21 in accordance with the present invention. Flange portions 46 and 48 of the part 19 and of the plate 23 of the part 21, respectively, extend axially inward, rearward and frontward, respectively, of the housing 18 to conform in close fitting and detachable relationship to the inner surfaces of the flat side walls 45 adjacently around the periphery of the forward and rearward end edges of the housing sidewalls 45. Front and back substantially flat end wall portions 50 and 52 extend vertically in the front end 19 and back plate 23, respectively. The portions 50 and 52 extend from over the housing end edges to the meter attachment and socket attachment assemblies 28 and 22 provided in the parts 19 and 21, respectively. The attachment of the flanges 46 and 48 to the housing 18 may be made by a suitable fastener means such as sheet metal screws, now shown, extending into the side walls 45 and flanges 46 and 48. The fastening of the end parts 19 and 21 to the housing 18 provides the integral unit 14 having the detail features as described further hereinafter. It is noted that the axial length of the housing 18 can vary while having the same height and width sizes at the forward and rearward end openings to accommodate one size for each of the front end and rear end parts 19 and 21.

Referring now to the front end part 19 of the enclosure unit 14 as shown in FIG. 1, the aforementioned meter attachment assembly 20 includes a circular mounting rim 56 extending integrally from the front vertical wall 50 of the front end part 19. The rim 56 has a radial outward circular flange configuration having a standard diameter which is less than the height and width dimensions of the housing 18. The rim dimension is within those specified for the detachable meter mounting rim of a standard ring type meter socket. When the detachable watthour meter 15 is assembled to the front end of the enclosure 14 and against the forward radial surface of the rim 56, the standard sealing ring 16 couples the detachable mounting arrangements of the enclosure of the meter 15 and the enclosure unit 14 together in a sealed relationship, as shown. The sealing ring 16 has the standard U-shaped cross section for radially overlapping the base 30 of the meter enclosure around the outer periphery of the cover locking rim 31 and the back of the rim 56, as shown in FIG. 1. One suitable sealing ring for use as the sealing ring 16 is disclosed in U.S. Pat. No. 4,149,741, assigned to the assignee of this invention.

Figure 5:
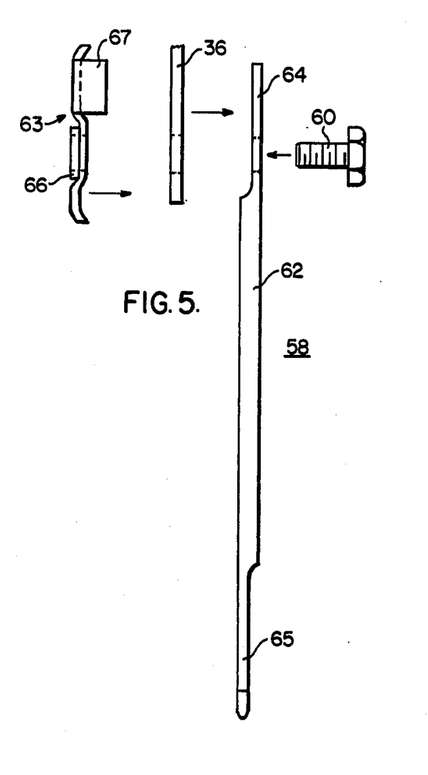
FIG. 5 is an exploded edge view of one terminal blade extension shown in FIG. 1 and made in accordance with the present invention.
Figure 6:
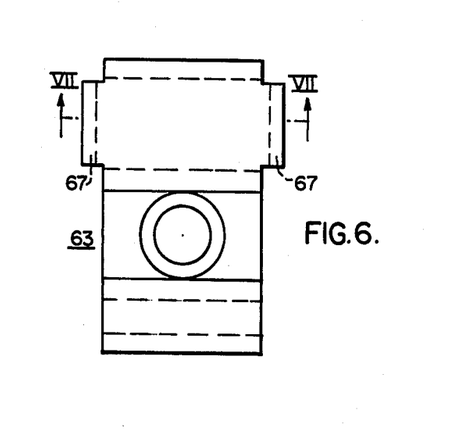
FIG. 6 is a top elevational view of one part of the forward end of the blade extension shown in FIG. 5.
Figure 7:
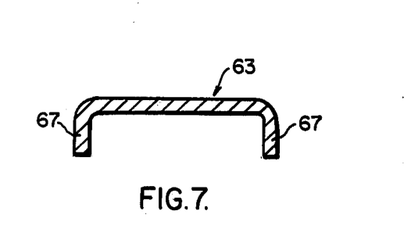
FIG. 7 is a cross-sectional view of FIG. 6 taken along the axis VII—VII and looking in the direction of the arrows.

Prior to the detachable mounting of the watthour meter 15 to the enclosure unit 14, four identical blade terminal extensions 58, shown in FIGS. 1 and 5, are attached by removable rigid clamping members, including four threaded fasteners 60 formed by machine screws, to the four meter blade terminals 36. One of the terminal extensions 58 is shown in the exploded view of FIG. 5 as it is formed from a rectangular bar conductive copper material being the same or similar to the conductive material forming the blades 36. Each terminal extension 58 includes long and short overlapping parts 62 and 63. The extensions 58 are receivable in the jaw terminals 44 to interconnect the meter blades 36 therewith. The long blade-like part 62 has a middle or center body portion approximately twice the thickness of one of the meter blade terminals 36 and approximately the same width. The forward and rear ends 64 and 65 of the part 62 have a reduced thickness to be approximately the same as that of the meter blade terminals. Accordingly the end 65 forms a jaw contact end corresponding to one of the blade terminals 36. The recessed end 64 and part 63 form a slot opening when connected by the fastener 60 to clamp both sides of the blade terminal 36. The separate part 63 is stamped from the same copper material as included in the part 62 having a flat nut-like or thread receiving portion 66 to which the fastener 60 is threaded. The ends are bent to engage the thicker body of the part 62 and the blade terminal 36 when clamped thereto by the fastener 60. As shown in FIG. 7, the forward half of the part 63 has an integral pair of bent tabs 67 for extending over the opposite edges of the received blade terminal 36 and the end 64 of the part 62. The tabs 67 maintain the separable and clamping part 63 of the forward end of the extension 58 in a non-rotative position as the fastener 60 is applied through holes in the meter blade terminal 36, in the end 64 of part 62 and into the portion 66.

Figure 8:
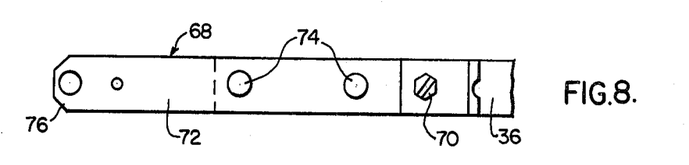
FIG. 8 is a top elevational view of an alternate form of a terminal blade extension.

An alternative blade terminal extension 68 is shown in FIGS. 8 and 9. Four of the terminal extensions 68 replace the extensions 58 for the meter 15 shown in FIG. 1. Each of the extensions include long and short overlapping parts 72 and 73. The parts 72 and 73 are preferably riveted together by rivets 74 or can be welded together. The blade extension parts have substantially the same width and thickness as the bar material of the meter blades 36. The forward end of the part 72 is offset to form a bifurcated forward end having a slot 75 with straight sides for receiving one of the meter blade terminals 36, as shown in FIG. 9. The flat inner sides of the parts 72 and 73 are rigidly clamped in a fixed relationship with substantial compressive pressure to both sides of each of the meter blade terminals 36 by each of the rigid fasteners 70 to provide an expanded and positive electrical contact area therebetween. Electrical resistance and resulting heating is substantially reduced by the use the blade terminal extensions 58 and 68 as compared to that produced by the resilient contact engagement provided between auxiliary or additional blade to jaw terminal connections or joints provided in many of the aforementioned prior art auxiliary equipment enclosure units. Thus, the terminal blade extensions 58 and 68 of the enclosure unit 14 are capable of conducting rated meter current values, for example two hundred amperes for the detachable watthour meter 15 without excessive heating being generated in the housing 18 due to the connections between the extensions 58 and 68 and meter blade terminals 36.

The rear jaw contact ends 76 of each of the terminal blade extensions 68 are identical and have substantially the same size and configuration as the corresponding jaw contact ends of the meter blade terminals 36, as are the corresponding ends 65 of the extensions 58. Accordingly, the predetermined lengths of the terminal extensions 58 and 68 provide a length in the blade extension contact ends 65 and 76 as they extend from the rear of the unit 16 which is the approximately same as the length that the meter blade terminals 36 extend from the meter 15. With the enclosure unit 14 mounted between the meter 18 and meter socket 40 as shown in FIG. 1, the rear contact ends 65 and 76 of the terminal extensions 58 and 68, respectively, mate and extend into electrical contact with the jaw terminals 44 in the same manner as if the meter blade terminals 36 were mounted in the jaw terminals 44 when the meter 15 is mounted directly to the meter socket 40.

Figure 2:
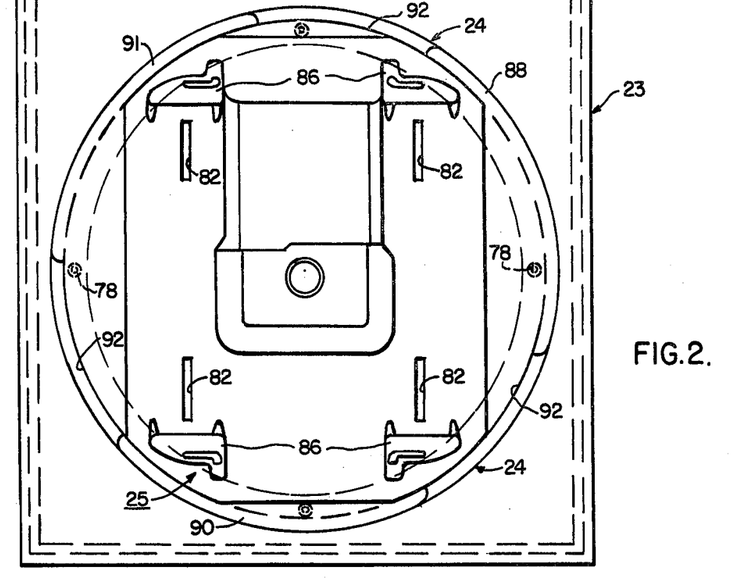
FIG. 2 is a rear elevational view of the enclosure unit shown in FIG. 1 with parts removed.

The rear end part 21 of the enclosure unit 14, as shown in FIGS. 1 and 2, is formed as an integral part when the back plate 23, mounting extension 24 and base 25 are clamped together by the threaded stud fasteners 78 received in mutually aligned holes of the three parts 23, 24 and 25. The base 25 is terminated by blade support areas, shown in the cross sectional view of FIG. 1, at the back side 81 of the base 25 extending radially inward from the mounting extension 24. Slot openings 82 in the base back side 81 receive, in close fitting relationship to the sides thereof, the blade terminal extensions 58. The base part 25 is substantially identically to the corresponding watthour meter base 30. Accordingly, the base 25 includes feet projections 86 which are substantially identical to the corresponding feet projections 38 of the meter base 30. The position of the feet projections 86 relative to each of the slots 82, as shown in FIG. 2, is the same as the positions of the base feet projections 38 are relative to the meter blade terminals 36.

In one alternative embodiment of the enclosure unit 14, not shown, modified and shortened forms of the terminal extensions 58 are used so that forward portions thereof terminate within the housing 18 adjacent the rear thereof. Cotter pins, not shown, extending through the partial blade extensions on either side of the enclosure unit back side wall 81 maintain them in place to extend from the rear of the unit 14. The detachable meter 15 is not mounted on the front end of the unit 14 and the opening thereof is covered by a circular cap, also not shown, having an internally grooved rim for attachment over the rim 66. Thus arranged, the one alternative enclosure unit is detachably mountable at either of the standard meter sockets by the adaptive attachment assembly 22 without a meter.

Referring now in particular detail to the adaptive socket attachment assembly 22 shown in FIG. 1, the mounting extension 24 of the assembly 22 extends axially and horizontally from the back vertical end wall 52 of the plate 23 at the back of the housing 18 and terminates at the circular opening receiving the base 25. Outer substantially straight interrupted cylindrical periphery of the extension 24 has a diameter that circumscribes an area that is less than the height or width vertical plane dimensions of the housing 18 to accommodate the different standard detachable meter mounting arrangements as noted hereinbelow. Three circularly arcuate projections 88, 89 and 90, shown equally circumferentially spaced in FIG. 2, are formed in a common circular plane in the outer cylindrical peripheral surface of the extension 24 having interrupted groove recesses 91 with radially opposing sides that are recessed behind each of the projections 88, 89 and 90. The spaces between the projections define arcuate openings forming axial slots between the circumferentially adjacent ones of the projections 88, 89 and 90. The continuous inner cylindrical surface 92 of the extension 24 commonly forms the circular bottom of the circularly arcuate slot openings and circularly arcuate groove recesses 91 behind the projections 88, 89 and 90.

Figure 3:
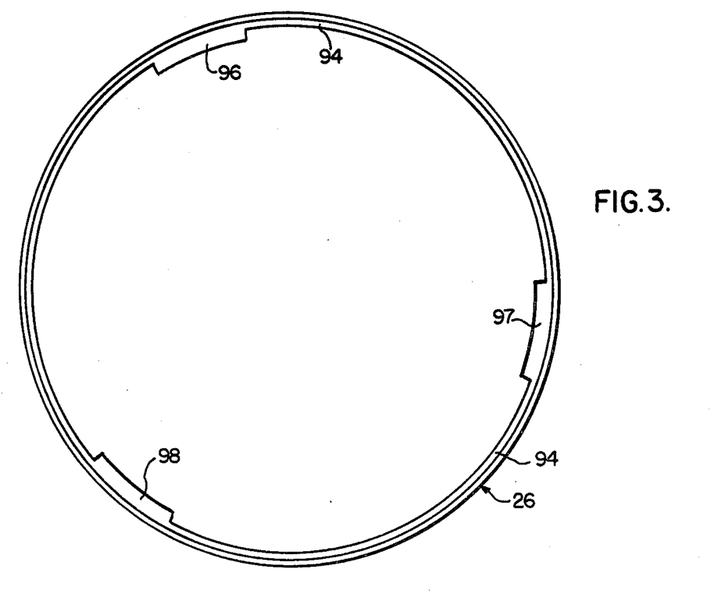
FIG. 3 is a front elevational view of the retainer ring member shown in FIG. 1.

The retainer ring member 26 is shown in FIG. 3 as it has a continuous flat circular radial portion 94 defining a radial mounting flange with three integral locking tabs 96, 97 and 98 extending radially and coplanar inward from the flat portion 94 and terminating at an inner circularly arcuate diameter slightly greater than the surface 92. The ring member 26 is made of a flat sheet metal material in one preferred form. The ring member 26 is mounted to the mounting extension 24 of the rear end part 21 by aligning the locking tabs 96, 97 and 98 with the arcuate slot gaps or spaces between the projections 88, 89 and 90 and then axially slipping the locking tabs forward over the mounting extension surface 92 until they abut the forward annular shoulder extending behind the projections 88, 90 and 91 that forms the forward radial sides of groove recesses behind them. The retainer ring member 26 is then rotated so that the locking tabs are positioned behind the projections in close fitting relationship with the opposite radial sides of the groove recesses 91 as shown in FIG. 1.

The outer diameter of the retainer ring member 26 is made, in one preferred form, to have approximately the same diameter as the outer periphery of the meter cover locking rim 31 providing the mounting flange portion of the standard detachable mounting arrangement of the meter 15. Thus, after the retainer ring member 26 is removably assembled to the mounting extension 24 and the enclosure unit 14 is inserted into the socket 40 so that the four blade terminal extensions 58 are received by the four jaw terminals 44, as shown in FIG. 1, a sealing ring 101 maintains the unit 14 in place by overlapping the circular mounting rim 103 of the socket 40 and the retainer ring member 26. The sealing ring 101 can be the same as the sealing ring 16, described above. An elastomeric gasket 104 is used in one preferred embodiment to provide a weather tight seal between outer periphery of the end part 21 and the front of the socket mounting rim 103 defining the circular opening of the socket 40.

The fragmentary cross-sectional view of FIG. 4 illustrates the detachable mounting of the enclosure unit 14 to the ringless type socket 41 by means of the socket attachment assembly 22. The socket 41 includes a standard meter mounting arrangement wherein the box enclosure 106 has a front cover 108 with a standard center circular opening 110 intended to receive a watthour meter cover such as meter 15 has. The socket cover 108 is opened from the enclosure 106 so that the rear end part 21, without the ring member 26, can be applied rearwardly through the front of the opening 110 which receives the cylindrical mounting extension 24. The cover is passed over the extension periphery beyond the groove recesses 91 and the projections 88, 89 and 90 which have a predetermined axial spacing from the rear of the housing. The retainer ring member 26 is then slipped over the mounting extension 24 and the tabs thereof are rotationally positioned in the grooves 91 behind the extension projections. Then, the blade terminal extensions are inserted into the jaw terminals associated with a terminal block, not shown, in the socket 41 upon closing the cover. The cover 108 is then sealed or locked to the enclosure box 106 in a conventional manner. The retainer ring member 26 overlaps the inner side of the cover 108 adjacent the edges of the opening 110 to prevent withdrawal of the enclosure unit 14. The removal of the ring member 26 is prevented since the enclosure unit 14 cannot be rotated with the ends of the blade terminal extensions thereof being retained by the jaw terminals of the associated socket.

It is contemplated that the ring member 26 may be permanently attached to the mounting extension 24 so that the extension 24 would be removed from the back plate 23 to be inserted forwardly through the back of a ringless socket cover 108. This permits the attached ring member 26 to be removed from the rear of the housing 18 and assembled to the cover 108 and thereafter remounted to the housing 18 by fastening the modified mounting extension 24 to the plate 23 with the cover 108 sandwiched between the ring member 26 and the end wall 52. Further modification within the general features of an adaptive socket attachment assembly made in accordance with this invention is to provide the mounting extension 24 and a radial ring flange in an integral molded piece. A further modification is made by providing circular grooves generally like the grooves 91 with axial slots thereto formed by projections such as 88, 89 and 90 but located in front of the ring flange and at the forward end of the mounting extension. The back 52 of a modified plate 23 terminates at a modified circular hole adapted to receive the outer periphery of the mounting extension provided with radially inward extending tabs that slip axially over the axial slots so that the sides of the grooves receive the tabs as the modified mounting extension is rotated. The front of the integral mounting extension and ring flange, duplicating the separable ring member 26, is then insertable through the rear side of the cover 108 until the ring flange abuts it and thereafter the modified mounting extension is assembled to the rear of the housing 18 by the inward extending tabs of the modified form of the plate 23 being received by the axial slots and then the mounting groove of the mounting extension. Mounting at the ring type socket 40 would be the same as described hereinabove for the adaptive socket attachment assembly 22.

Figure 10:
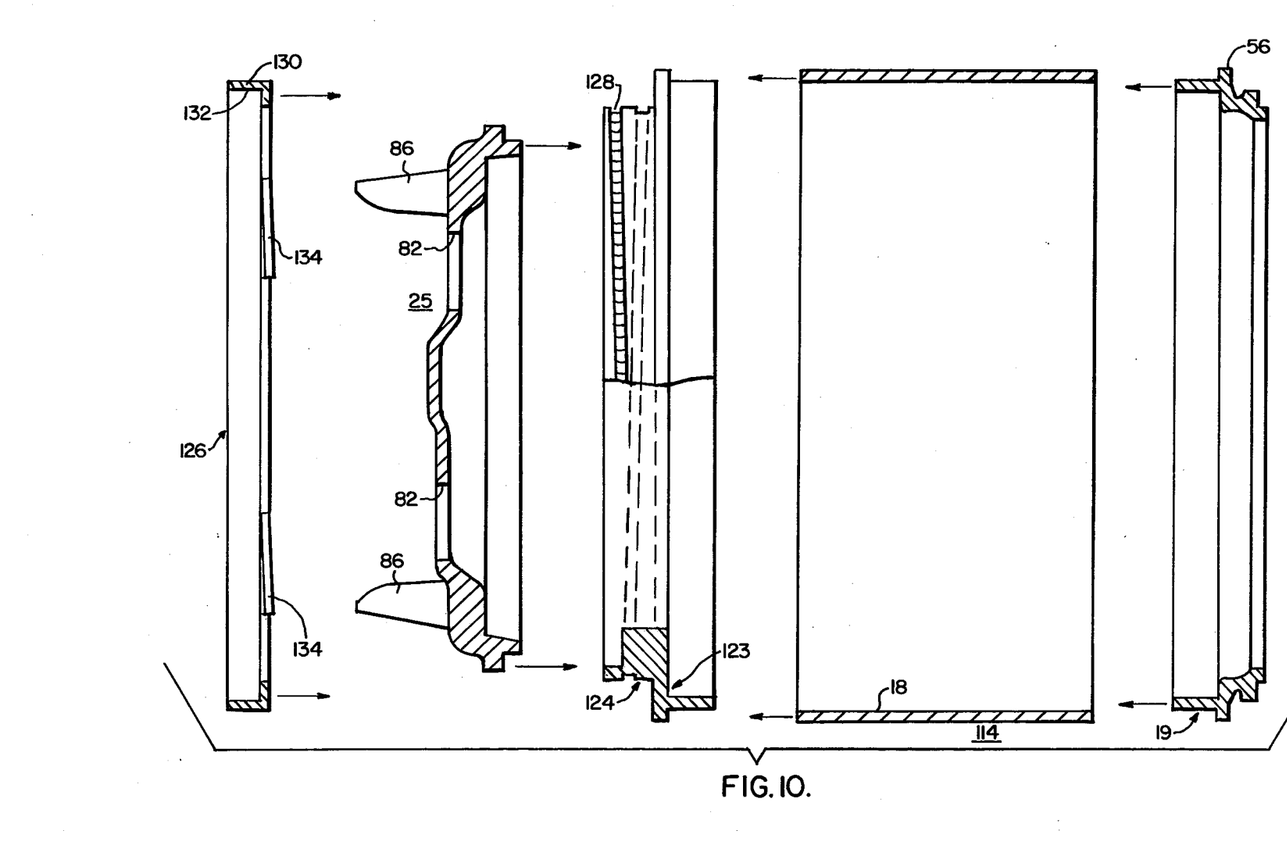
FIG. 10 is an exploded side sectional view, with part in side elevation, of an alternative form of an auxiliary equipment enclosure unit made in accordance with the present invention.
Figure 11:
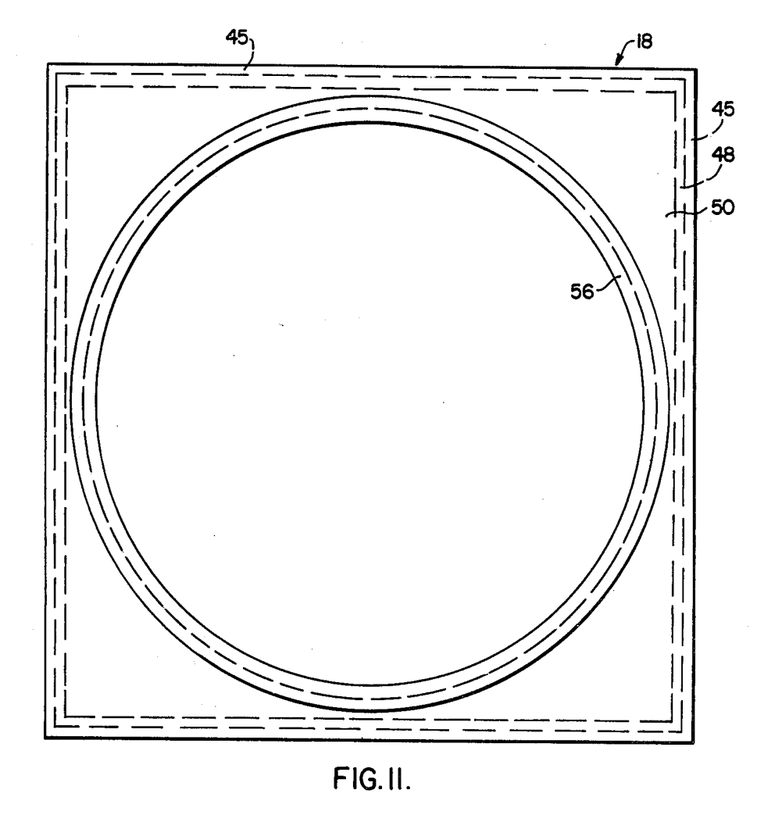
FIG. 11 is a rear elevational view of one part of the enclosure unit shown in FIG. 10.

FIG. 10 illustrates an exploded cross-sectional view of an alternative embodiment of an auxiliary equipment enclosure unit 114, made in accordance with this invention, including the same housing 18 and front end part 19 as provided in the enclosure unit 14 as described above. The rear end part 121 is a modification of the above-described rear end part 21 to provide a modified socket attachment assembly 122 formed on a single molded part having a back plate portion 123 integrally carrying a mounting extension portion 124. The portion 123 is assembled to the housing 18 as described above for the back plate 23. The rear end part 121 further includes the base 25 which is assembled to the mounting extension portion 124 as also described above. The base 25 may be molded as an integral portion with the portions 123 and 124 so that the rear end part 121 is a single piece. The socket attachment assembly further includes an alternative retainer ring member 126 generally providing the same universal socket mounting function as does the ring member 26.

The mounting extension portion 124 includes a cylindrical surface substantially the same diameter as the extension 24 with a helical groove recessed portion 128 for receiving the retainer ring member 126 as described hereinafter. The ring member 126 has the same outer diameter as the ring member 26 and is further formed with an axially rearward extending rim portion 130 integral with the flat radial portion 132 which substantially corresponds to the flat band-like portion 94 of the ring member 26. Thus, the ring member 126 has an L-shaped cross-section. Three locking tabs 134, two being shown in FIG. 10, extend radially inward from the continuous radial portion 132 generally as do the locking tabs 96 except that the tabs 134 are bent at angles to the portion 94 to extend in a common helical plane to effectively form an interrupted single internal thread receivable in a screw threading fashion to the groove recess 128. Thus, the retainer ring member 126 is rotated to be threadably assembled to the mounting extension 124 to detachably mount the enclosure unit 114 to either of the ring or ringless meter socket mounting arrangements in a manner corresponding to that in which the retainer ring member 26 mounts the enclosure unit 14. The ring socket 40 of FIG. 1 has the enclosure unit 114 secured thereto by the sealing ring 101 extending over both the rim 130 of the assembled retainer ring member 126 and the mounting rim 103 of the socket. The ringless socket 41 of FIG. 4 has the enclosure unit 114 secured thereto by the radially outward extending ring member 126 overlapping the inner side of the cover 108 after extension 124 is inserted through the cover.

The enclosure units 14 and 114 are capable of being altered in accordance with this invention by modifications other than those already described above as may be apparent to those skilled in the art. For example, the rear end parts 21 and 121 and front end part 19 are disclosed wholly covering the ends of the housing and it is contemplated that various sizes of the housings may be used with partial end walls radially inward terminating at common size openings thereof so that one size for the end parts 19, 21 and 121 can be used to accommodate the various housing sizes. These and other alterations and modifications may be made without departing from the spirit and scope of this invention.

We claim:

1. An auxiliary equipment enclosure unit mountable at watthour meter sockets each having one of at least two detachable meter mounting arrangements, said enclosure unit comprising: a hollow body defining a housing portion adapted to receive separate equipment devices therein; and an adaptive socket attachment assembly including a mounting extension extending axially from the rear end of said housing portion along an outer periphery circumscribing an area less than the vertical cross sectional area of said housing portion with said mounting extension including a recessed portion having opposed radial sides disposed in said mounting extension, and said adaptive socket attachment assembly further including a removable retainer means receivable over said extension and rotatably, positionable into said recessed portion so as to be axially confined by said radial sides and upon said enclosure unit being mounted to either one of the at least two meter mounting arrangements of the meter sockets, said retainer member is maintained in a predetermined radially overlapping relationship therewith for retaining said enclosure unit at the meter socket.

2. The auxiliary equipment enclosure unit as claimed in claim 1 wherein said retainer means includes a substantially flat circular ring.

3. The auxiliary equipment enclosure unit as claimed in claim 1 wherein said retainer means has a substantially L-shaped cross section and a circular ring shape so as to define a radial part receivable by said recessed portion and an axial part defining a rim having a predetermined diameter.

4. The auxiliary equipment enclosure unit as claimed in claim 2 wherein said retainer means includes plural arcuately spaced locking tabs extending radially inward.

5. The auxiliary equipment enclosure unit as claimed in claim 3 wherein said retainer means is made of a sheet metal material and includes plural locking tabs extending radially inward.

6. The auxiliary equipment enclosure unit as claimed in claim 2 wherein said recessed portion includes a continuous groove extending radially into said outer periphery of said mounting extension.

7. The auxiliary equipment enclosure unit as claimed in claim 4 wherein said mounting extension portion includes arcuately spaced projections defining the rear sides of plural grooves defining said recessed portion wherein said plural locking tabs are axially receivable by said mounting extension between said projections and thereafter rotatably receivable by said plural grooves.

8. The auxiliary equipment enclosure unit as claimed in claim 4 wherein said mounting extension includes a helical groove defining said opposed radial sides of said recessed portion and further wherein said retainer means includes said locking tabs each having an angular orientation for being receivable by said helical groove.

9. An auxiliary equipment enclosure unit for interposed mounting between a detachable watthour meter and a meter socket having jaw terminals for receiving blade terminals of said meter, said enclosure unit comprising: a central housing having an interior adapted to receive and enclose auxiliary equipment devices therein; a front end part extending from one end of said housing and including meter attachment means for detachably receiving a watthour meter; an adaptive socket attachment assembly extendible from the other end of said housing and having a mounting extension for extending rearwardly from said housing and further having a retainer ring carried by said mounting extension so as to extend radially outward therefrom in a substantially circular flange configuration and so as to be separable from the other housing end; plural blade terminal extensions each including a conductive bar extending through said housing and beyond said mounting extension for a predetermined length, each of said extensions further having a rear contact end for insertion into a separate one of the jaw terminals, further having a forward end having two opposing sides spaced for receiving a separate one of the meter blade terminals, and still further having a rigid clamping member for fixedly clamping each of the meter blade terminals between the opposing ends of each of said plural blade terminal extensions.

10. The auxiliary equipment enclosure unit as claimed in claim 9 wherein each of said plural blade terminal extensions includes a removable part forming one of said opposing sides of said forward end thereof and wherein each of said rigid clamping members includes a screw fastener for extending through said opposing sides to effect the clamping of a meter blade terminal thereto.

11. The auxiliary equipment enclosure unit as claimed in claim 10 wherein said conductive bar has a forward end forming the other of said opposing sides of each of said terminal extensions and has a thickness less than at the center portion thereof for defining a recess for receiving a meter blade.

12. The auxiliary equipment enclosure unit as claimed in claim 11 wherein said removable part of each of said terminal extensions extends in overlapping contact relationship with the center portion of each conductive bar.

13. The auxiliary equipment enclosure unit as claimed in claim 12 wherein said removable part of each of said terminal extensions includes an internal thread portion for threadably receiving each screw fastener and further includes at least one tab for extending over an edge of the forward end of each conductive bar.

14. An auxiliary equipment enclosure unit for interposed mounting between watthour meter sockets having either of at least two detachable meter mounting arrangements and a detachable watthour meter having rear blade terminals, said enclosure unit comprising: a housing having a front end for attachment to the detachable watthour meter and a rear end, the interior of said housing adapted to receive and enclose auxiliary equipment devices therein; said rear end including an adaptive socket attachment assembly including a mounting extension extending from the back of said housing, said mounting extension including a recessed portion including a groove extending radially into the circumference of said mounting extension; said adaptive socket attachment assembly further including a retainer ring having radially inward extending tab means receivable by said groove of said mounting extension so as to extend radially outward therefrom and define a rim surface having a predetermined diameter; a plurality of blade terminal extensions including straight conductive bar members each with a forward end having opposing sides for receiving each of the meter blade terminals within overlapping contact across said opposing sides thereof; and a plurality of threaded clamping members each rigidly attaching the opposing forward ends of each of the blade terminal extensions to the meter blade terminal received therein.

15. The auxiliary equipment enclosure unit as claimed in claim 14 wherein said front end and said rear end of said housing are separate parts removably attached to the ends of said housing.

16. The auxiliary equipment enclosure unit as claimed in claim 15 wherein said separate rear end part includes a separate base portion including slot openings for receiving said terminal extensions and integral back plate and mounting extension portions carrying said base portion and being removably mounted to said housing.

17. The auxiliary equipment enclosure unit as claimed in claim 14 wherein said mounting extension includes plural circularly arcuate projections substantially equally circumferentially spaced defining plural interrupted portions of said groove recess portion and further defining plural openings between said projections communicating with the interrupted groove portions, whereby separate ones of said tab means of said retainer ring are axially positionable through said plural openings and rotatably positionable within said plural interrupted groove portions.

18. The auxiliary equipment enclosure unit as claimed in claim 14 wherein said mounting extension includes said recessed portion being formed in a helical groove and further wherein said retainer ring has said tab means being disposed in an helical orientation for complementary mating with said helical groove of said mounting extension.

19. The auxiliary equipment enclosure unit as claimed in claim 15 wherein each of said blade terminal extensions includes a removable part forming one of said opposing sides at the forward end thereof and receiving one of the plurality of threaded clamping members.

* * * * *